US012495450B2

(12) United States Patent
Karampatsis et al.

(10) Patent No.: US 12,495,450 B2
(45) Date of Patent: Dec. 9, 2025

(54) AUTHORIZING AND CONFIGURING PAIRING OF UNMANNED AERIAL SYSTEM

(71) Applicant: Lenovo (Singapore) Pte. Ltd., New Tech Park (SG)

(72) Inventors: Dimitrios Karampatsis, Ruislip (GB); Sheeba Backia Mary Baskaran, Friedrichsdorf (DE); Andreas Kunz, Ladenburg (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 308 days.

(21) Appl. No.: 18/019,694

(22) PCT Filed: Aug. 3, 2021

(86) PCT No.: PCT/IB2021/057120
§ 371 (c)(1),
(2) Date: Feb. 3, 2023

(87) PCT Pub. No.: WO2022/029635
PCT Pub. Date: Feb. 10, 2022

(65) Prior Publication Data
US 2023/0276509 A1    Aug. 31, 2023

Related U.S. Application Data

(60) Provisional application No. 63/060,505, filed on Aug. 3, 2020.

(51) Int. Cl.
*H04W 76/10* (2018.01)
*H04W 12/06* (2021.01)
(Continued)

(52) U.S. Cl.
CPC .......... *H04W 76/10* (2018.02); *H04W 12/06* (2013.01); *H04W 48/18* (2013.01); *H04W 84/06* (2013.01)

(58) Field of Classification Search
CPC .............................. H04W 12/06; H04W 48/18
(Continued)

(56) References Cited

U.S. PATENT DOCUMENTS

2022/0360948 A1* 11/2022 Moon ................. H04L 41/0894

FOREIGN PATENT DOCUMENTS

WO    2020143569 A1    7/2020

OTHER PUBLICATIONS

PCT/IB2021/057120, "Notification of Transmittal of the International Search Report and the Written Opinion of the International Searching Authority, or the Declaration", International Searching Authority, Nov. 8, 2021, pp. 1-12.

(Continued)

*Primary Examiner* — Dang T Ton
(74) *Attorney, Agent, or Firm* — Kunzler Bean & Adamson

(57) ABSTRACT

Apparatuses, methods, and systems are disclosed for authorizing and configuring pairing of unmanned aerial system. An apparatus includes a transceiver that receives, at a first network function of a mobile wireless communication network, a first authorization of unmanned aerial vehicle ("UAV") operations and a second authorization for associating a UAV-controller with the UAV, the first and second authorizations associated with a first identifier. An apparatus includes a processor that creates a 5G local area network ("LAN") group within the mobile wireless communication for facilitating communications between the UAV and the UAV-controller and associating a second identifier with the 5G LAN group, configures the 5G LAN group based on at least at least one parameter associated with the UAV and updates a third network function with information for the 5G LAN group for establishing a protocol data unit ("PDU") session between the UAV and the UAV controller.

20 Claims, 13 Drawing Sheets

(51) Int. Cl.
*H04W 48/18* (2009.01)
*H04W 84/06* (2009.01)

(58) Field of Classification Search
USPC .................................. 370/329, 401, 402, 403
See application file for complete search history.

(56) References Cited

OTHER PUBLICATIONS

3GPP, "3rd Generation Partnership Project; Technical Specification Group Services and System Aspects; Study on supporting Unmanned Aerial Systems (UAS) connectivity, Identification and tracking (Release 17)", 3GPP TR 23.754 V0.2.0, Jun. 2020, pp. 1-83.
3GPP, "3rd Generation Partnership Project; Technical Specification Group Services and System Aspects; Procedures for the 5G System (5GS); Stage 2 (Release 16)", 3GPP TS 23.502 V16.5.0, Jul. 2020, pp. 1-594.

* cited by examiner

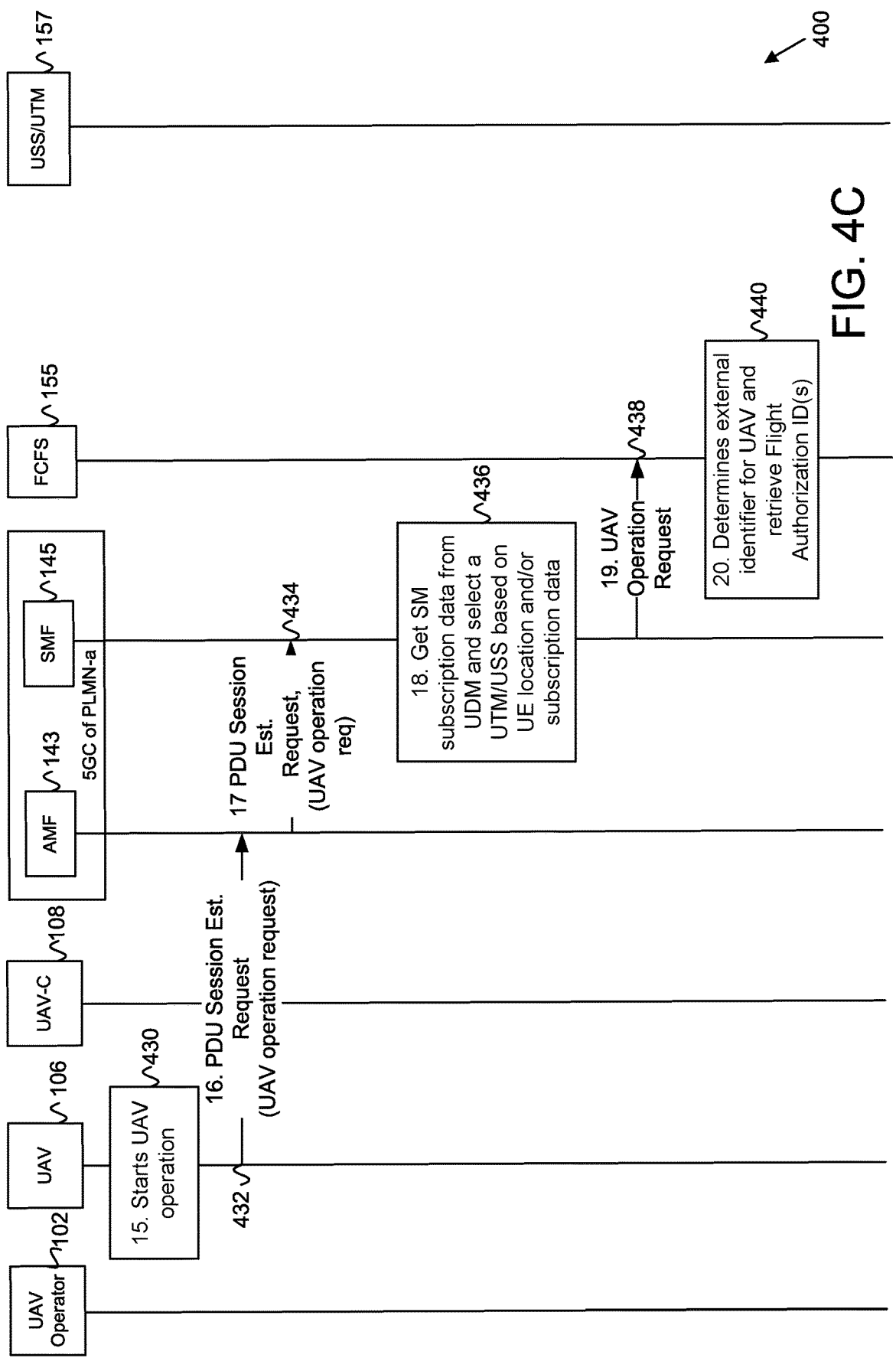

AUTHORIZING AND CONFIGURING PAIRING OF UNMANNED AERIAL SYSTEM

CROSS-REFERENCE TO RELATED APPLICATIONS

This application claims priority to U.S. Provisional Patent Application No. 63/060,505 entitled "METHOD FOR AUTHORIZING AND CONFIGURING PARING OF UAS WITHIN 3GPP SYSTEM" and filed on Aug. 3, 2020, for Dimitrios Karampatsis, et al., which is incorporated herein by reference.

FIELD

The subject matter disclosed herein relates generally to wireless communications and more particularly relates to authorizing and configuring pairing of unmanned aerial system.

BACKGROUND

In certain wireless communication systems, a User Equipment device ("UE") is able to connect with a fifth-generation ("5G") core network (i.e., "5GC") in a Public Land Mobile Network ("PLMN"). Unmanned aerial vehicles ("UAVs") and controllers for UAVs may utilize wireless communication systems for communications.

BRIEF SUMMARY

Disclosed are procedures for authorizing and configuring pairing of unmanned aerial system. Said procedures may be implemented by apparatus, systems, methods, and/or computer program products.

An apparatus for authorizing and configuring pairing of unmanned aerial system includes, in one embodiment, a transceiver that receives, at a first network function of a mobile wireless communication network, a first authorization of unmanned aerial vehicle ("UAV") operations and a second authorization for associating a UAV-controller with the UAV, the first and second authorizations associated with a first identifier. The apparatus, in one embodiment, includes a processor that creates a 5G local area network ("LAN") group within the mobile wireless communication for facilitating communications between the UAV and the UAV-controller and associating a second identifier with the 5G LAN group, configures the 5G LAN group based on at least at least one parameter associated with the UAV and updates a third network function with information for the 5G LAN group for establishing a protocol data unit ("PDU") session between the UAV and the UAV controller.

In another embodiment, an apparatus includes at transceiver that receives, at a first network function from a second network function, a first notification comprising parameters of a 5G local area network ("LAN") group of a mobile wireless communication network, the 5G LAN group facilitating communications between a UAV and a UAV-controller. The transceiver, in further embodiments, receives, at the first network function from a third network function, a second notification comprising an authorization to establish a first connection for command and control ("C2") communication from a first device. The apparatus, in one embodiment, includes a processor that determines that the 5G LAN group is associated with the first connection based on the first notification and configures a fourth network function with at least one parameter for the 5G LAN group based on the parameters received in the first notification from the second network function to associate the first connection with a second connection from a second device.

Another apparatus, in one embodiment, includes a transceiver that receives, at a first network function from a second network function, a first notification comprising parameters of a 5G local area network ("LAN") group of a mobile wireless communication network, the 5G LAN group facilitating communications between a UAV and a UAV-controller. The apparatus, in various embodiments, includes a processor that determines that the UAV needs updated user equipment ("UE") route selection policies ("USRPs") for command and control ("C2") operations and creates at least one URSP rule with a new connection capability for UAV C2 operations comprising at least one parameter of the 5G LAN group as a route selection descriptor.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4C is a continuation of the procedure depicted in FIG. 4B;

DETAILED DESCRIPTION

Figure 1:
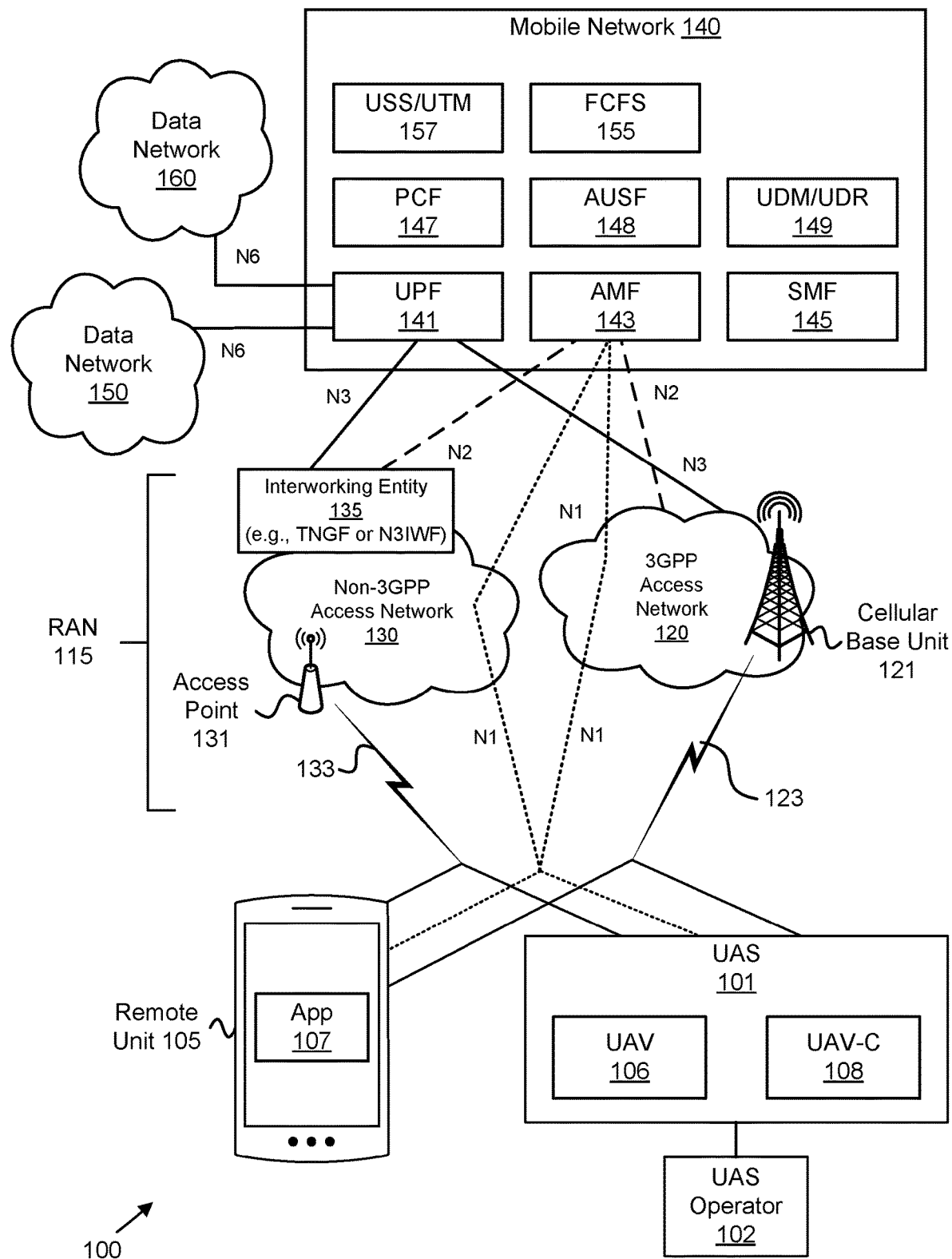
FIG. 1 is a schematic block diagram illustrating one embodiment of a wireless communication system for authorizing and configuring pairing of unmanned aerial system.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for authorizing and configuring pairing of unmanned aerial system. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In one embodiment, the proposed solution identifies how a request by an unmanned aerial vehicle ("UAV") to establish user plane connection via a third-generation partnership project ("3GPP") system is authorized by an aviation authority. The problem that is solved with this invention is to provide a solution on how an aviation authority authorizes the request by certifying that the UAV is authorized to perform a UAV operation from a paired UAV controller and how a UAV controller can be associated with a UAV within the 3GPP core network.

FIG. 1 depicts a wireless communication system 100 for authorizing and configuring pairing of unmanned aerial system, according to embodiments of the disclosure. In one embodiment, the wireless communication system 100 includes at least one remote unit 105, a Fifth-Generation Radio Access Network ("5G-RAN") 115, a mobile core network 140, and an unmanned aerial system ("UAS") 101. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In one embodiment, the UAS 101 comprises components, networks, hardware, software, and/or the like for conducting unmanned aircraft operations between a UAV 106, e.g., a drone, and a UAV controller 108. The UAV 106 may refer to an aircraft without a human pilot, crew, or passengers that is remotely controlled using a UAV controller 108. A UAV controller 108 may refer to device that is configured to wirelessly send instructions to the UAV 106 for controlling the UAV, e.g., for controlling the speed, direction, orientation, and/or the like of the UAV, e.g., via the mobile network 140, an access network 120, 130, and/or the like. The UAS operator 102 may be the person who operates the UAV 106 (e.g., via the UAV controller 108) and who, typically, requests flight authorizations. The UAV 106 and UAV controller 108 may each be UEs in the wireless communication system 100 and/or may include an instance of a remote unit 105. As such, the UAV 106 and/or the UAV controller 108 may communicate with an access network 120 to access services provided by a mobile core network 140.

In some embodiments, the UAV 106 and/or the UAV-C controller 108 communicates with a FCFS 155 and/or a USS/UTM 157 function via a network connection with the mobile core network 140. The USS/UTM 157, in one embodiment, provides a set of overlapping USSs that assist UAV 106 operators 102 in conducting safe and compliant operations. The services may include deconfliction of flight plans, remote identification, and/or the like.

As described below, the UAV 106 and/or UAV controller 108 may establish a PDU session (or similar data connection) with the mobile core network 140 using the RAN 115. The mobile core network 140 may then relay traffic between the UAV 106 and the UAV controller 108 and the packet data network 150 using the PDU session.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

To solve the problem of authorizing and configuring pairing of unmanned aerial system, described above, the present disclosure proposes solutions that identify how a request by an unmanned aerial vehicle ("UAV") to establish user plane connection via a third-generation partnership project ("3GPP") system is authorized by an aviation authority. The problem that is solved with this invention is to provide a solution on how an aviation authority authorizes the request by certifying that the UAV 106 is authorized to perform a UAV operation from a paired UAV controller 108 and how a UAV controller 108 can be associated with a UAV 106 within the 3GPP core network.

In an embodiment of a conventional solution, the UAV 106 provides within a container in non-access stratum ("NAS") signaling the identifier of a UAV controller 108 to which the UAV 106 is to be paired, or the UAV controller 108 can provide the identifier of the UAV 106 to which it is to be paired. The UTM/USS 157 uses the information to ascertain if the UAV 106 is authorized to be controlled by that UAV controller 108. The disadvantage, however, with this approach is that it requires appropriate configuration from the UAS operator 102 to ensure the correct UAV identifier and UAV Controller identifier are configured to the UAV 106 and the UAV controller 108, respectively. Note that in such an embodiment, the UAS operator 102 receives the UAV identifiers when registering the UAV 106 and UAV controller 108 to a USS provider.

In another conventional embodiment, the UTM/USS 155 is used to associate/pair a UAV 106 with a UAV controller 108. Each UAV 106 provides its identity to the UTM/USS 157. The UTM/USS 157 authorizes the request and allocates a universally traceable identifier ("UTID") that is used by the UAVs 16 when establishing a PDU session with the PLMN. The disadvantage with this approach, however, is that it is proposed that the UTM/USS 157 is to be the main function to associate a UAV 106 with its UAV controller 108. However, the main function of the UTM/USS 157 is to allow a civil aviation authority to provide authorization for flights and track location of UAVs 106.

In certain embodiments, the solution proposed herein overcomes the shortcomings in the conventional solutions by using a Flight Coordination Subsystem ("FCSF") 155 located in the 3GPP core network where upon receiving an authorization of a UAV's flight operation creates a 5G LAN group for the UAV 106 and the associated UAV controller 108. In one embodiment, the FCSF 155 sends a notification to the 5G core network of the newly created 5G LAN group that is stored in the subscription profile in the UDM/UDR 149. The UDM/UDR 149 then notifies the PCF 147 that a new 5G LAN group has been created. The PCF 147 creates updated UE route selection policies ("URSP") and rules for the UAV 106 and the UAV controller 108 that are used to establish a PDU session for UAV operation.

Figure 2:
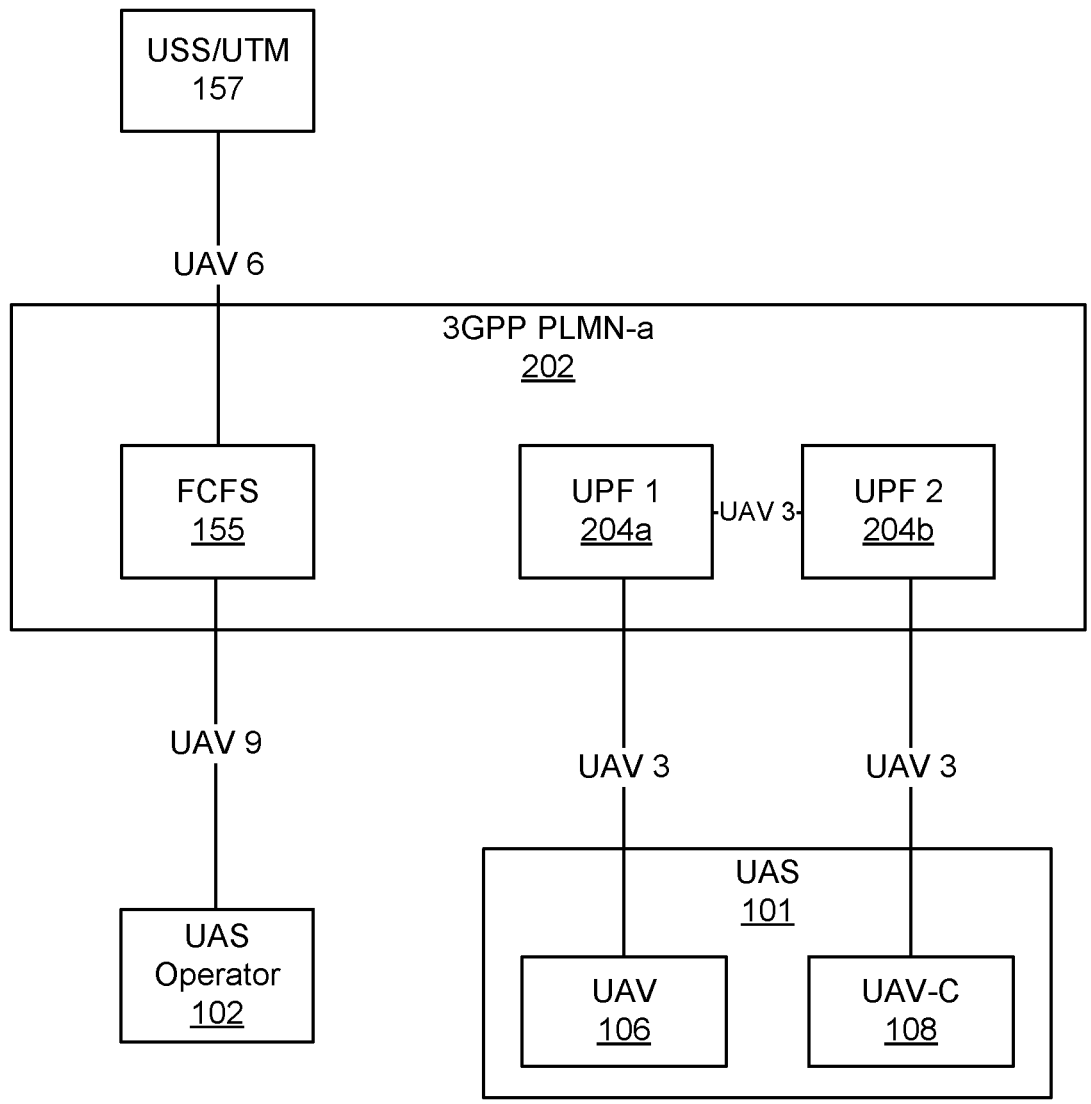
FIG. 2 depicts one embodiment of a network architecture for authorization of pairing and connectivity setup for a UAV and a UAV controller.

FIG. 2 depicts one embodiment of a network architecture 200 for authorization of pairing and connectivity setup for a UAV 106 and a UAV controller 108. In the depicted architecture 200, the UAS operator 102 owns, manages, maintains, administers, or the like, the UAS 101 that contains a UAV controller 108 and a UAV 106. The UAV controller 108 and UAV 106, in one embodiment, are paired via a UAV 3 reference point when both connect via the 3GPP core network 202.

In one embodiment, the UAS operator 102 requests flight authorization for a UAS 101 via a UAV 9 reference point to the FCSF 155 that is part of the 3GPP core network 202. The FCSF 155, in further embodiments, interfaces with a UTM/USS 157 via a UAV 6 reference point. The UTM/USS 157 may be a separate function with an interface defined outside of 3GPP. It is noted that, in one embodiment, an implementation-based interface may be used between the UAS operator 102 and FCSF 155 instead of a standardized UAV 9 reference point, which is out of scope of 3GPP.

In one embodiment, at the time the UAS operator 102 registers the UAS 101, which is composed of a UAV controller ("UAV-C") 108 and UAV(s) 106, to the UTM/USS 157, the UAS operator 102 may provide the UAV-C 108 and UAV(s) 106 external identifiers (e.g., a generic public subscription identifier ("GPSI"), a mobile station international subscriber directory number ("MSISDN"), and/or the like). In further embodiments, the UTM/USS 157 assigns a UAS registration identifier for the UAS 101. If the 3GPP network 202 has deployed an optional FCSF 155, the FCSF 155 may assign a 3GPP-level UAS identifier corresponding to the UAS registration identifier. In an alternative embodiment, the FCSF 155 may be aware of the UAS external identifiers and provide them to the UTM/USS 157.

In one embodiment, when a UAS operator 102 submits a request for flight authorization, the UAS operator 102 includes the 3GPP-level UAS identifier or UAS registration identifier and may include external identifiers for the UAV 106 and UAV-C 108 to the FCSF 155. In one embodiment, the FCFS 155 may identify external identifiers for the UAV 106 and UAV-C 108, if not provided by the UAS operator 102. In certain embodiments, the FCFS 155 forwards the request for flight authorization to the UTM/USS 157. The UTM/USS 157, in response to the flight authorization request, may authorize the request, ensuring that the UAV-C 108 is allowed to control the UAV 106 and assigning a flight authorization identifier. The flight authorization identifier may also be used as authorization for pairing.

In one embodiment, when the UAS 101 establishes a user plane connection via the 3GPP system 202, e.g., a PDU session. the UAV 106 may indicate that connectivity is required for UAV operation. This indication may be a combination of a specific data network name ("DNN'), a single—network slice selection assistance information ("S-NSSAI"), and/or or a new indication.

In one embodiment, the SMF 145 determines that the request is for UAV operation and sends a request to the FCSF 155. The FCSF 155, in certain embodiments, determines the external identifier of the UAV 106 and the flight authorization identifiers that are authorized for this UAV 106 and forwards the request to the UTM/USS 157.

In one embodiment, when the UTM/USS 157 receives the authorization request, the UTM/USS 157 authorizes the request to ensure that the UAV controller 108 that is linked or associated with the provided external identifier can pair with the UAV 106 that is associated with the provided external identifier and is linked to the flight authorization identifier.

Figure 3:
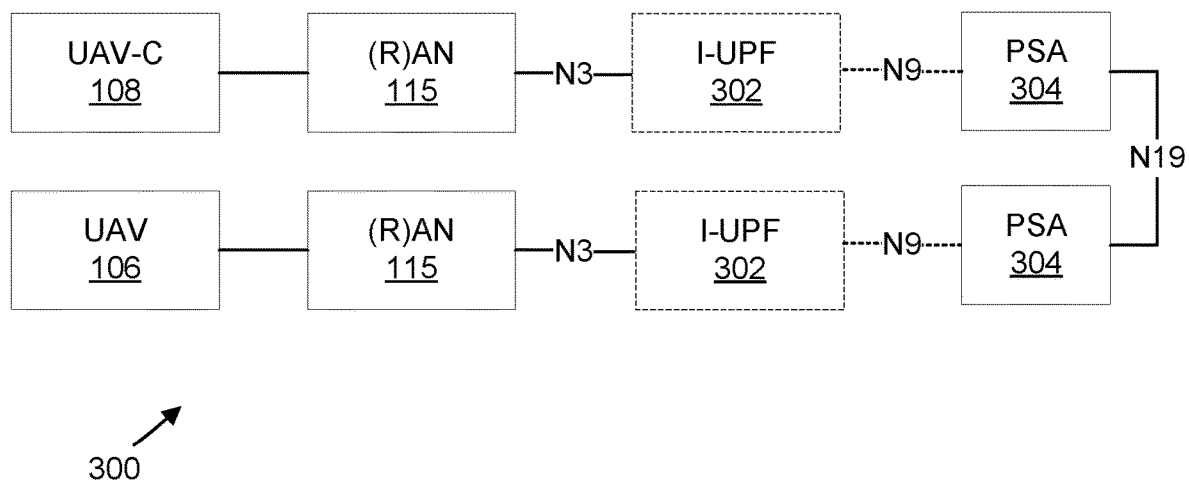
FIG. 3 depicts one embodiment of a flow diagram for pairing a UAV and a UAV-C using a 5G LAN group.

In one embodiment, when the FCSF 155 receives the authorization approval, the FCSF 155 configures a 5G LAN in the 3GPP system allowing the UAV-C 108 and UAV 106 to communicate as shown in FIG. 3. The FCSF 155, in one embodiment, acts as an application function and provides configuration parameters to setup a 5G LAN group. The connection between the UAV-C 108 and the UAV 106 may be via UAV 3, which is supported by associating the PDU session of the UAV 106 with the PDU session of the UAV-C 108, as described in more detail below.

FIG. 3 depicts one embodiment of a flow diagram 300 for pairing a UAV 106 and a UAV-C 108 using a 5G LAN group. In the depicted embodiments, the UAV 106, and the UAV-C 108 each access the RAN 115 to establish a PDU session via a user plane function 302, which is anchored by a PDU session anchor 304. As shown in FIG. 3, the PDU sessions of the UAV 106 and the UAV-C 108 are associated, linked, paired, or the like via a 5G LAN group for facilitating communications between the UAV 106 and the UAV-C 108.

Figure 4A:
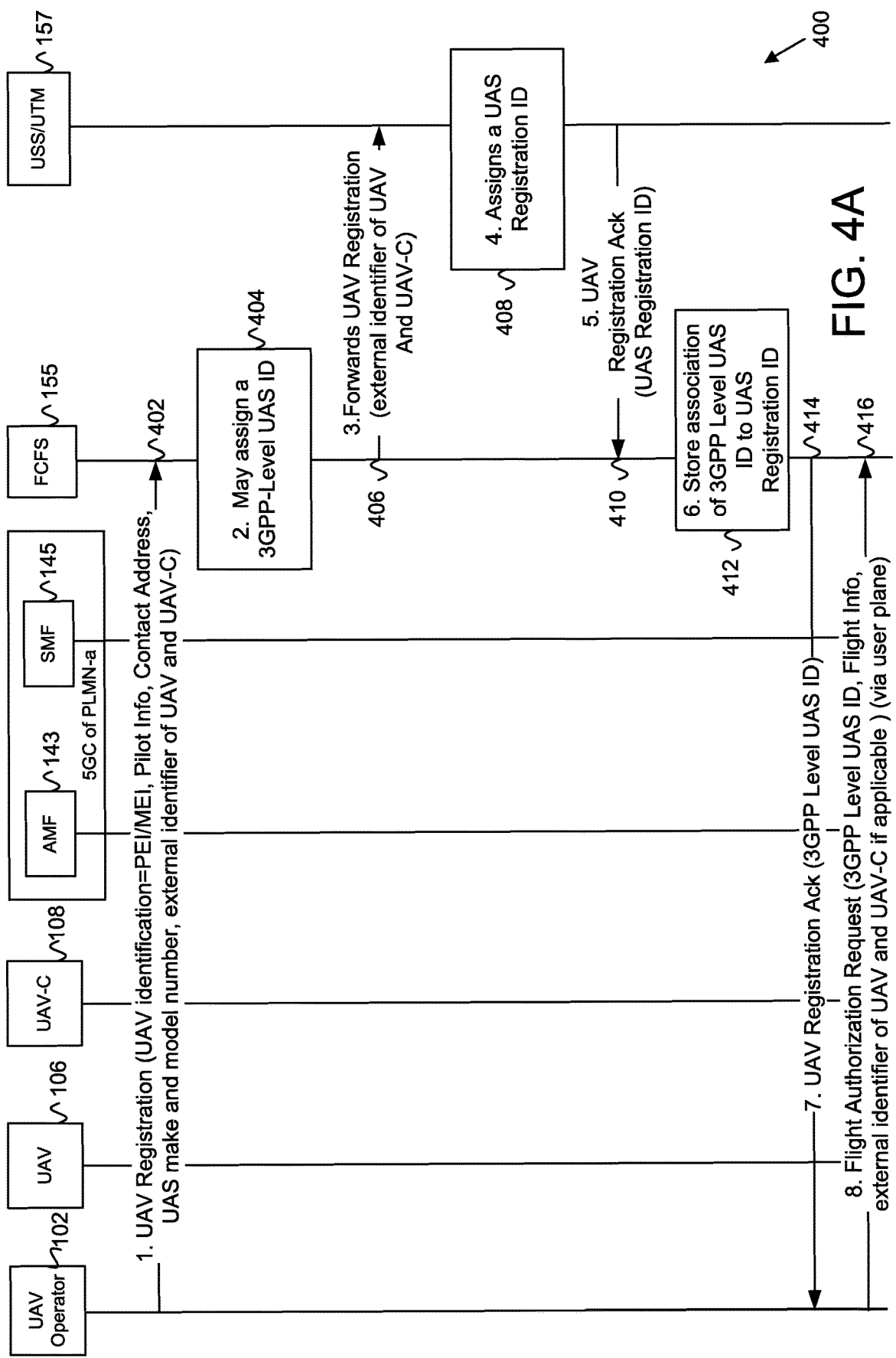
FIG. 4A depicts one embodiment of a signal flow diagram for authorizing and configuring pairing of unmanned aerial system.

FIGS. 4A-4D depict one embodiment of a signal flow diagram 400 for authorizing and configuring pairing of unmanned aerial system. Referring to FIG. 4A, at step 1, a UAS operator 102 initiates (see messaging 402) a UAS registration procedure with an FCFS 155 located within the 3GPP core network. The FCSF 155, in one embodiment, interfaces with a USS/UTM 157. The UAS operator 102, in certain embodiments, provides information about the UAS system such as external identifiers for the UAV 106 and the UAV-C 108 (e.g., MSISDN, GPSI, or the like), the UAS model, the UAS type, and/or the like.

At step 2, in one embodiment, the FCSF 155 assigns (see block 404) a 3GPP identifier (e.g., a 3GPP-level UAS identifier) for the UAS 101 and associates it to the external identifier of the UAV 106 and UAV-C 108.

At step 3, in one embodiment, the FCSF 155 forwards (see messaging 406) the registration request to a USS/UTM 157. The FCSF 155 may include the external identifiers of the UAV 106 and UAV-C 108 of the UAS 101.

At step 4, in one embodiment, the USS/UTM 157 assigns (see block 408) a UAS registration identifier that is valid for the UAS system 101, e.g., for the UAV 106 and UAV-C 108 pair. At step 5, in one embodiment, the USS/UTM 157 provides (see messaging 410) a registration acknowledgment, which may include the UAS registration identifier.

At step 6, in one embodiment, the FCSF 155 stores (see block 412) the association between the UAS registration identifier and the 3GPP-level UAS identifier. At step 7, in one embodiment, the FCSF 155 sends (see messaging 414) the registration acknowledgment to the UAS operator 102, including the 3GPP-level UAS identifier.

In one embodiment, at step 8, the UAS operator 102 requests (see messaging 416) flight authorization for the UAS 101. In one embodiment, the request includes the flight details, the 3GPP-Level UAS identifier, and/or the external identifiers of the UAV 106 and UAV-C 108.

Figure 4B:
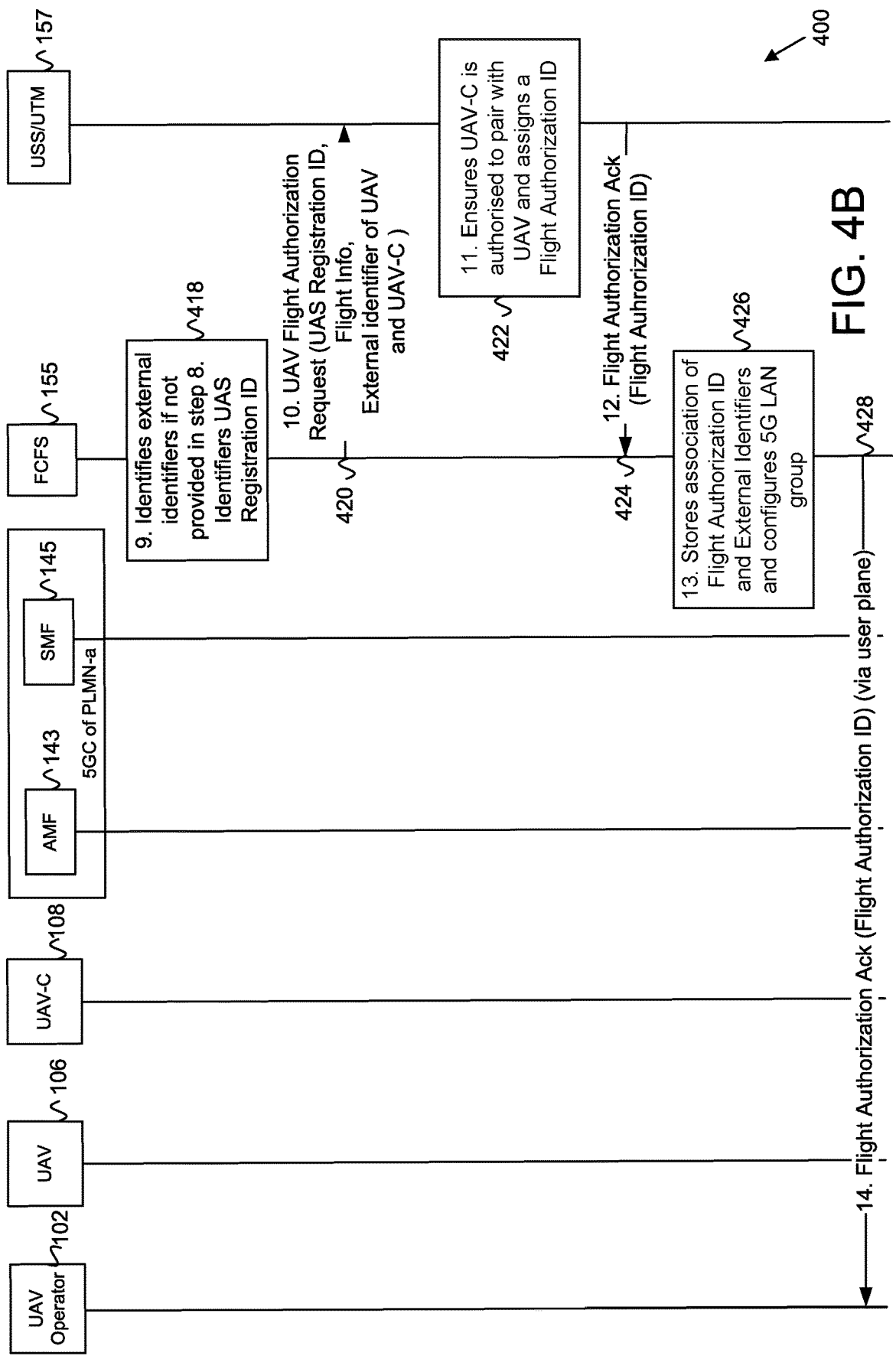
FIG. 4B is a continuation of the procedure depicted in FIG. 4A.

Referring to FIG. 4B, in one embodiment, at step 9, if the external identifiers for the UAV 106 and UAV-C 108 are provided in step 8, the FCSF 155 identifies (see block 418) the external identifiers of the UAV 106 and UAV-C 108, e.g., using the UAS registration identifier.

In one embodiment, at step 10, the FCSF 155 sends (see messaging 420) a flight authorization request to the USS/UTM 157, including the information provided by the UAS operator 102 in step 8 and the external identifiers of the UAS 101, e.g., the external identifiers for the UAV 106 and UAV-C 108.

In one embodiment, at step 11, the USS/UTM 157 ensures (see block 422) that the UAV-C 108 is authorized to pair with the UAV 106 and whether the flight path complies with civil aviation regulations. In such an embodiment, the USS/UTM 157 assigns a flight authorization identifier, which may be used as authorization for pairing and also authorization for UAV operations.

In one embodiment, at step 12, the USS/UTM 157 provides (see messaging 424) the flight authorization acknowledgement, including the flight authorization identifier to the FCSF 155. In one embodiment, at step 13, based on the authorization result, the FCSF 155 stores the association of the flight authorization identifier and the external identifiers, and configures (see block 426) a 5G-LAN group, which is described in more detail below. In one embodiment, at step 14, the FCSF 155 sends (see messaging 428) the flight authorization acknowledgement to the UAS operator 102.

Referring to FIG. 4C, at step 15, in one embodiment, the UAV 106 is triggered (see block 430) for flight operation. In such an embodiment, the UAV 106 is already registered with the 3GPP system.

In one embodiment, at step 16, the UAV 106 sends (see messaging 432) a request for a PDU session to an AMF 143, including an indication for UAV operation. The indication may be a specific DNN, a specific S-NSSAI, and/or another indication. The UAV 106 may determine the PDU session parameters based on updated URSP rules provided by the PCF 147 based on the 5G LAN group created by the FCSF 155 in step 13.

In one embodiment, at step 17, the AMF 143 selects an SMF 145 and sends (see messaging 17) a create SM context request message according to a PDU session establishment procedure, e.g., the PDU session establishment procedure described in TS 23.502.

In one embodiment, at step 18, the SMF 145 obtains (see block 436) the SM subscription data of the UAV 106 from the UDM 149. The SMF 145, in such an embodiment, determines from the subscription data that the FCSF 155 needs to be contacted and that the UAV 106 is part of a 5G LAN group. In one embodiment, at step 19, the SMF 145 sends (see messaging 438) a UAV operation request to the FCSF 155. In one embodiment, at step 20, the FCSF 155 determines (see block 440) the external identifier of the UAV 106 and the associated flight authorization identifier.

Figure 4D:
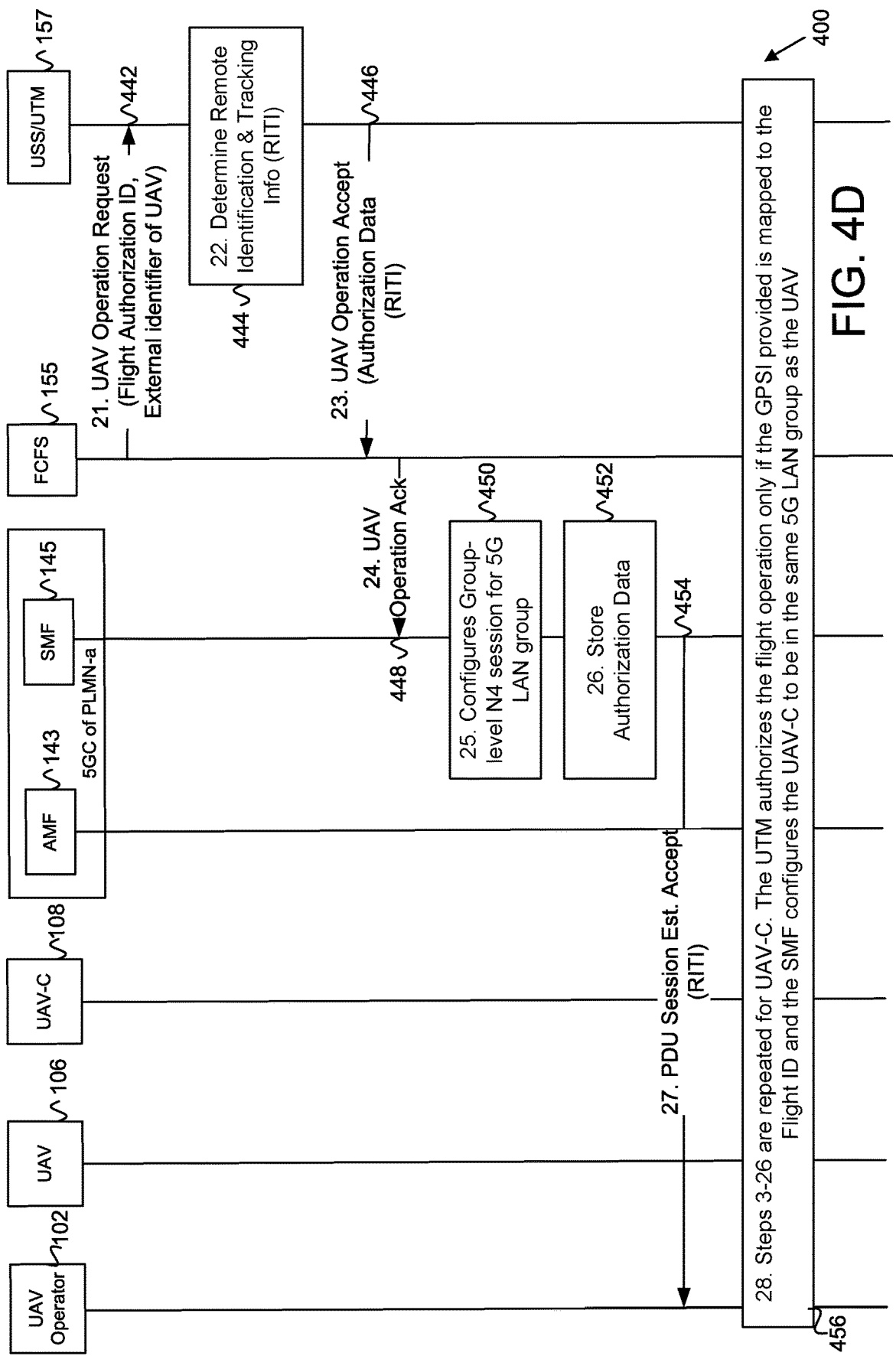
FIG. 4D is a continuation of the procedure depicted in FIG. 4C.

Referring to FIG. 4D, in one embodiment, at step 21, the FCSF 155 sends (see messaging 442) a UAV operation request to the USS/UTM 157, including the external identifier of the UAV 106 and the associated flight authorization identifier.

At step 22, in one embodiment, the USS/UTM 157 verifies (see block 444) that the UAV 106 is authorized for the flight according to the flight authorization identifier and the external identifiers and determines remote identification and tracking information ("RITI").

In one embodiment, at step 23, the USS/UTM 157 provides (see messaging 446) the authorization to the FCSF 155. At step 24, in one embodiment, the FCSF 155 forwards (see messaging 448) the authorization to the SMF 145.

At step 25, in one embodiment, based on the authorization, the SMF 145 configures (see block 450) a group-level N4 session for the 5G-LAN group, e.g., as described in TS 23.502 (this step may also be performed after step 18).

At step 26, in one embodiment, the SMF 145 stores (see block 452) the authorization data and, at step 27, sends (see messaging 454) a PDU session acknowledgement to the UAV 106, including the RITI.

In certain embodiments, steps 3-27 as depicted in FIGS. 4A-4D may be repeated for the UAV-C 108. In such an embodiment, the SMF 145 configures the UAV-C 108 to be in the same 5G-LAN group as the UAV 106.

Figure 5:
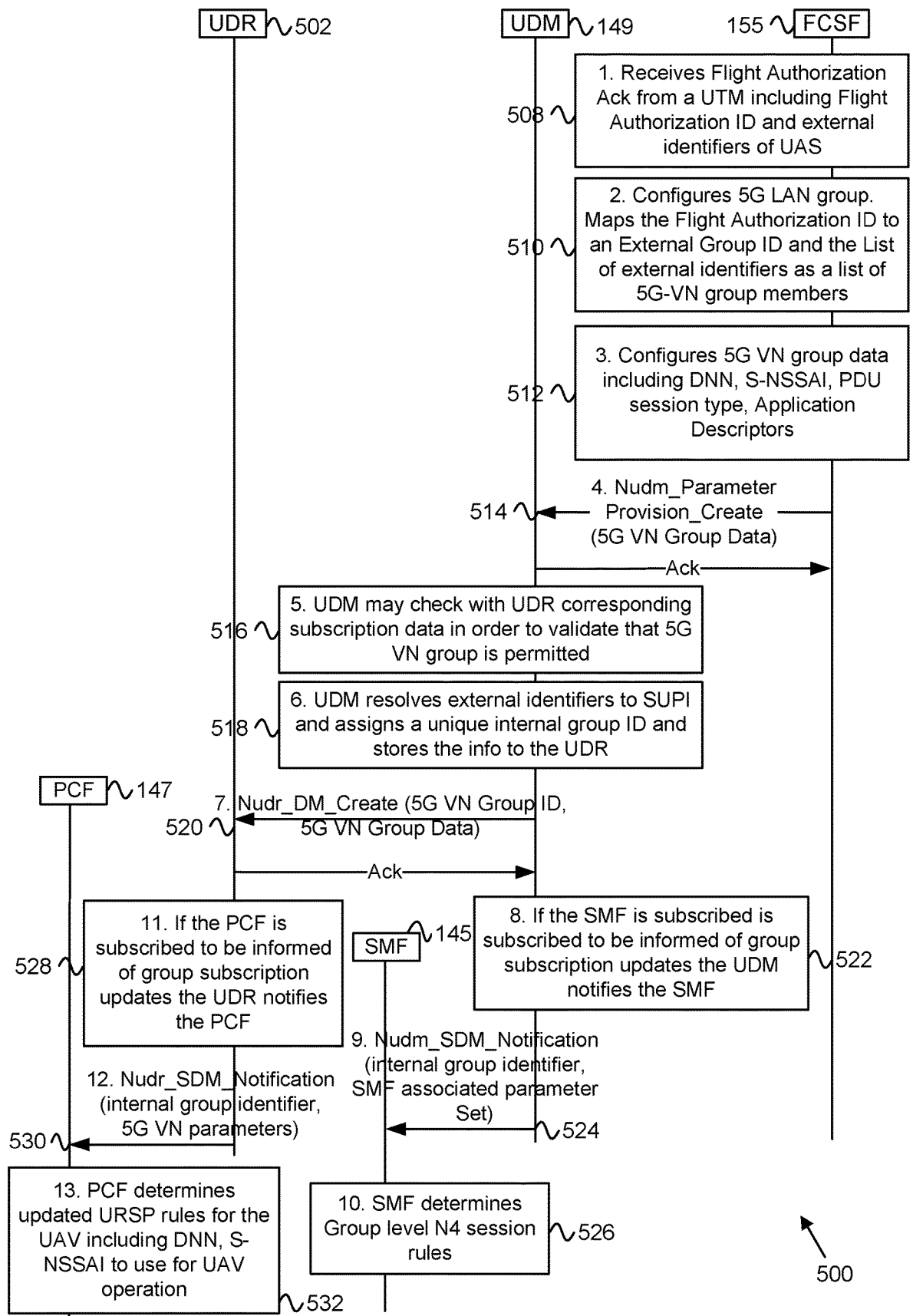
FIG. 5 depicts one embodiment of a signal flow diagram for configuring a 5G LAN group for authorizing and configuring pairing of unmanned aerial system.

FIG. 5 depicts one embodiment of a signal flow diagram 500 for configuring a 5G LAN group for authorizing and configuring pairing of unmanned aerial system. In one embodiment, when the FCSF 155 receives the flight authorization acknowledgement from the USS/UTM 157, including the flight authorization identifier, and optionally the external identifiers (see step 12 of FIG. 4B), the FCSF 155 configures a 5G LAN group for the UAS 101 (e.g., the UAV 106 and the UAV-C 108 pair).

The FCSF 155, in further embodiments, assigns the flight authorization identifier as an external group identifier for the 5G LAN (5G virtual network) group that includes the list of UAVs 106 with their external identifiers as members of this group. The FCSF 155, in certain embodiments, also configures 5G LAN group data, including DNN, S-NSSAI, and an applicable application identifier, e.g., an identifier for the application that is used in the UAV 106 for UAV operation. The FCSF 155, in certain embodiments, determines these parameters based on implementation or based on the UAS model and UAS type, which the FCSF 155 receives or is made aware of during the UAS registration procedure.

In one embodiment, once the FCSF 155 has the available data, it updates the UDM 149 with the 5G LAN group information. The UDM 149, in some embodiments, checks whether the UAVs 106 are permitted to form a 5G LAN group, assigns an internal group identifier for the 5G LAN group, and converts the external identifiers to subscription permanent identifiers ("SUPIs"). The UDM 149, in further embodiments, stores the group data as subscription information in the UDR 149.

In one embodiment, if the SMF 145 has subscribed to receive notification for group updates, the UDM 149 informs the SMF 145. The SMF 145 may configure a group level N4 session if there are existing PDU sessions active. In further embodiments, if the PCF 147 has subscribed to receive notifications for subscription updates from the UDR 149, the UDR 149 informs the PCF 147. The PCF 147 may use this information to configure updated URSP rules for the UAV 106 and UAV-C 108. In one embodiment, the UAV 106 uses the URSP rules when the UAV 106 requests user plane resources for UAV operation.

In one embodiment, the URSP rules can be configured as follows:
a. A URSP rule with a specific connection capability in the traffic descriptor. The connection capability requested by the Application in the UE may indicate "UAV operation;"
b. A URSP rule with a specific application identifier and/or traffic filter in the traffic descriptor. The application identifier and/or traffic filter may be mapped to the application in the UAV 106 used for UAV operation;
c. A URSP rule with a new indicator indicating UAV operation in the traffic descriptor.

As shown in FIG. 5, in one embodiment, at step 1, the FCSF 155 receives (see block 508), from the USS/UTM 157, an authorization for flight operation including a flight authorization identifier and external identifiers for the UAS 101, e.g., for the UAV 106-UAV-C 108 pair.

In further embodiments, at step 2, the FCSF 155 configures (see block 510) a 5G LAN group for the UAVs 106, setting the flight authorizations identifier as the external group identifier and the external identifiers as a list of members of the 5G LAN group.

In one embodiment, at step 3, the FCSF configures (see block 512) 5G VN group data for the 5G LAN group, which may include a DNN, a S-NSSAI, an applicable application identifier (e.g., the application used in the UAV 106 for UAV operation), and/or the like. The FCSF 155 may determine these parameters based on an implementation and/or based on the UAS model and type. In one embodiment, the FCSF 155 receives or determines the UAS model and type during the UAS registration procedure.

In step 4, in one embodiment, the FCSF 155 updates (see messaging 514) the UDM 149 by invoking the Nudm_ParameterProvision_Create service operation, including the 5G LAN group information. In step 5, in one embodiment, the UDM 149 checks (see block 516) if the UAVs 106 are permitted to form a 5G LAN group from the UDR 502.

In one embodiment, in step 6, the UDM 149 assigns (see block 518) an internal group identifier for the 5G LAN group and converts the external identifiers to SUPIs. At step 7, in one embodiment, the UDM 149 stores the group data as subscription information in the UDR 502 by invoking the Nuder_DM_Create service operation (or Nudr_DM_Update if it is an existing field in the database) (see messaging 520).

At step 8, in one embodiment, if the SMF 145 has subscribed to receive notifications for 5G LAN group updates, the UDM 149 informs the SMF 145 (see block 522). At step 9, in one embodiment, the UDM 149 invokes (see messaging 524) the Nudm_SDM_Notification service operation providing the 5G LAN group information to the SMF 145. In one embodiment, at step 10, the SMF 149 configures (see block 526) a Group Level N4 session if there are existing PDU sessions active.

In one embodiment, at step 11, if the PCF 147 has subscribed to receive notifications for subscription updates from the UDR 502, the UDR 502 informs (see block 528) the PCF 147. At step 12, in one embodiment, the UDR 502 invokes (see messaging 530) the Nudr_SDM_Notification service operation providing the 5G LAN group information to the SMF 145. At step 13, in one embodiment, the PCF 147 may use the 5G LAN group information to configure updated URSP rules for the UAV 106 and UAV-C 108.

Figure 6:
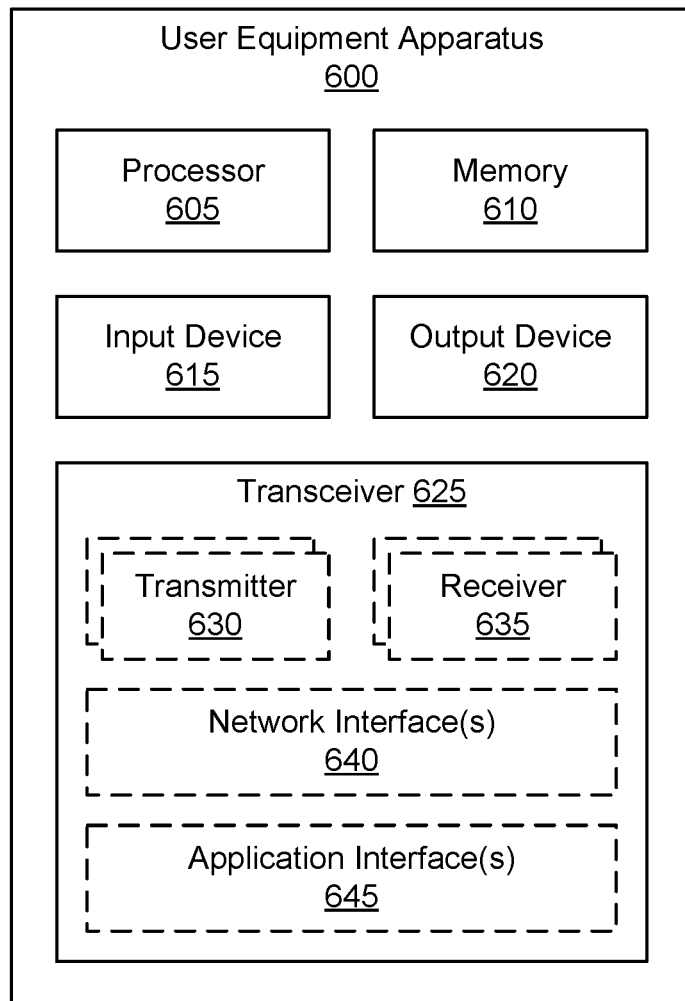
FIG. 6 is a block diagram illustrating one embodiment of a user equipment apparatus that may be used for authorizing and configuring pairing of unmanned aerial system.

FIG. 6 depicts a user equipment apparatus 600 that may be used for authorizing and configuring pairing of unmanned aerial system, according to embodiments of the disclosure. In various embodiments, the user equipment apparatus 600 is used to implement one or more of the solutions described above. The user equipment apparatus 600 may be one embodiment of the remote unit 105, the UE 205, the UAV 106, and/or the UAV controller 108, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panel supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PC5, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In certain embodiments, the processor 605 may include an application processor (also known as "main processor") which manages application-domain and operating system ("OS") functions and a baseband processor (also known as "baseband radio processor") which manages radio functions.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to authorizing and configuring pairing of unmanned aerial system. For example, the memory 610 may store various parameters, panel/beam configurations, resource assignments, policies, and the like as described above. In certain embodiments, the memory 610 also stores program code and related data, such as an operating system or other controller algorithms operating on the user equipment apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all, or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
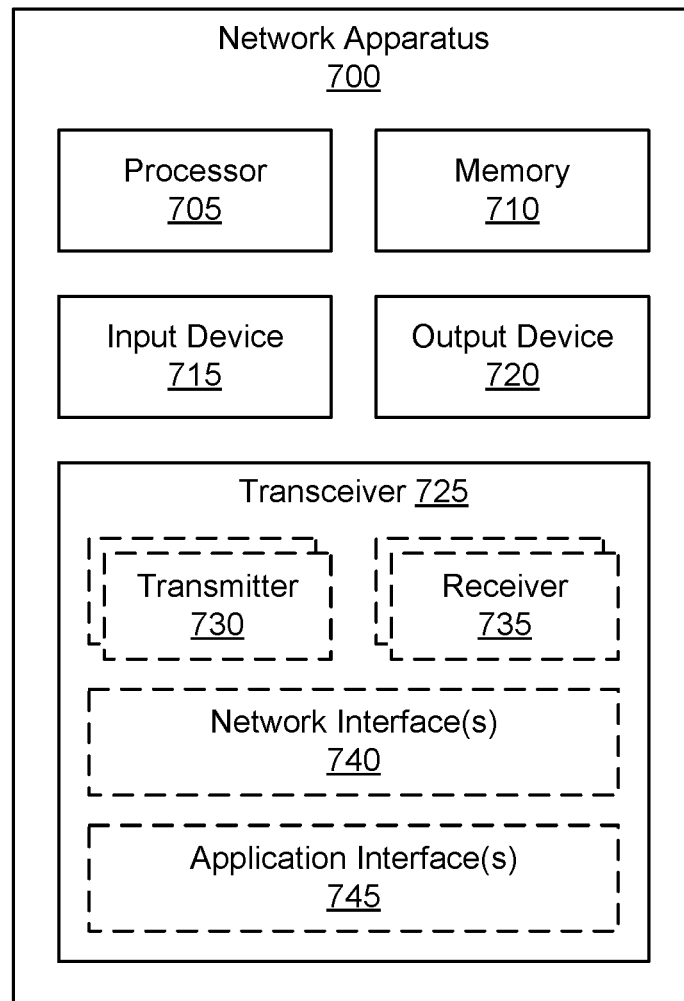
FIG. 7 is a block diagram illustrating one embodiment of a network apparatus that may be used for authorizing and configuring pairing of unmanned aerial system.

FIG. 7 depicts a network apparatus 700 that may be used for authorizing and configuring pairing of unmanned aerial system, according to embodiments of the disclosure. In one embodiment, network apparatus 700 may be one implementation of a RAN node, such as the base unit 121, the RAN node 210, or gNB, described above. Furthermore, the base network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2, N3, UAV 3, UAV 6, UAV 9, and/or the like. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 805 may include an application processor (also known as "main processor") which manages application-domain and operating system ("OS") functions and a baseband processor (also known as "baseband radio processor") which manages radio function.

In various embodiments, the network apparatus 700 is an FCFS, described above. In such embodiments, the transceiver (725) receives, at a first network function of a mobile wireless communication network, a first authorization of unmanned aerial vehicle ("UAV") operations and a second authorization for associating a UAV-controller with the UAV, the first and second authorizations associated with a first identifier.

In one embodiment, the processor (705) creates a 5G local area network ("LAN") group within the mobile wireless communication for facilitating communications between the UAV and the UAV-controller and associating a second identifier with the 5G LAN group, configures the 5G LAN group based on at least at least one parameter associated with the UAV, and updates a third network function with information for the 5G LAN group for establishing a protocol data unit ("PDU") session between the UAV and the UAV controller.

In various embodiments, the network apparatus 700 is an SMF, described above. In such embodiments, the transceiver 725 receives, at a first network function from a second network function, a first notification comprising parameters of a 5G local area network ("LAN") group of a mobile wireless communication network, the 5G LAN group facilitating communications between a UAV and a UAV-controller.

In further embodiments, the transceiver 725 receives, at the first network function from a third network function, a second notification comprising an authorization to establish a first connection for command and control ("C2") communication from a first device.

In one embodiment, the processor 705 determines that the 5G LAN group is associated with the first connection based on the first notification and configures a fourth network function with at least one parameter for the 5G LAN group based on the parameters received in the first notification from the second network function to associate the first connection with a second connection from a second device.

In various embodiments, the network apparatus 700 is a PCF, described above. In such embodiments, the transceiver 725 receives, at a first network function from a second network function, a first notification comprising parameters of a 5G local area network ("LAN") group of a mobile wireless communication network, the 5G LAN group facilitating communications between a UAV and a UAV-controller.

In one embodiment, the processor 705 determines that the UAV needs updated user equipment ("UE") route selection policies ("USRPs") for command and control ("C2") operations and creates at least one URSP rule with a new connection capability for UAV C2 operations comprising at least one parameter of the 5G LAN group as a route selection descriptor.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to authorizing and configuring pairing of unmanned aerial system. For example, the memory 710 may store parameters, configurations, resource assignments, policies, and the like, as described above. In certain embodiments, the memory 710 also stores program code and related data, such as an operating system or other controller algorithms operating on the network apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the NPN, PLMN and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

Figure 8:
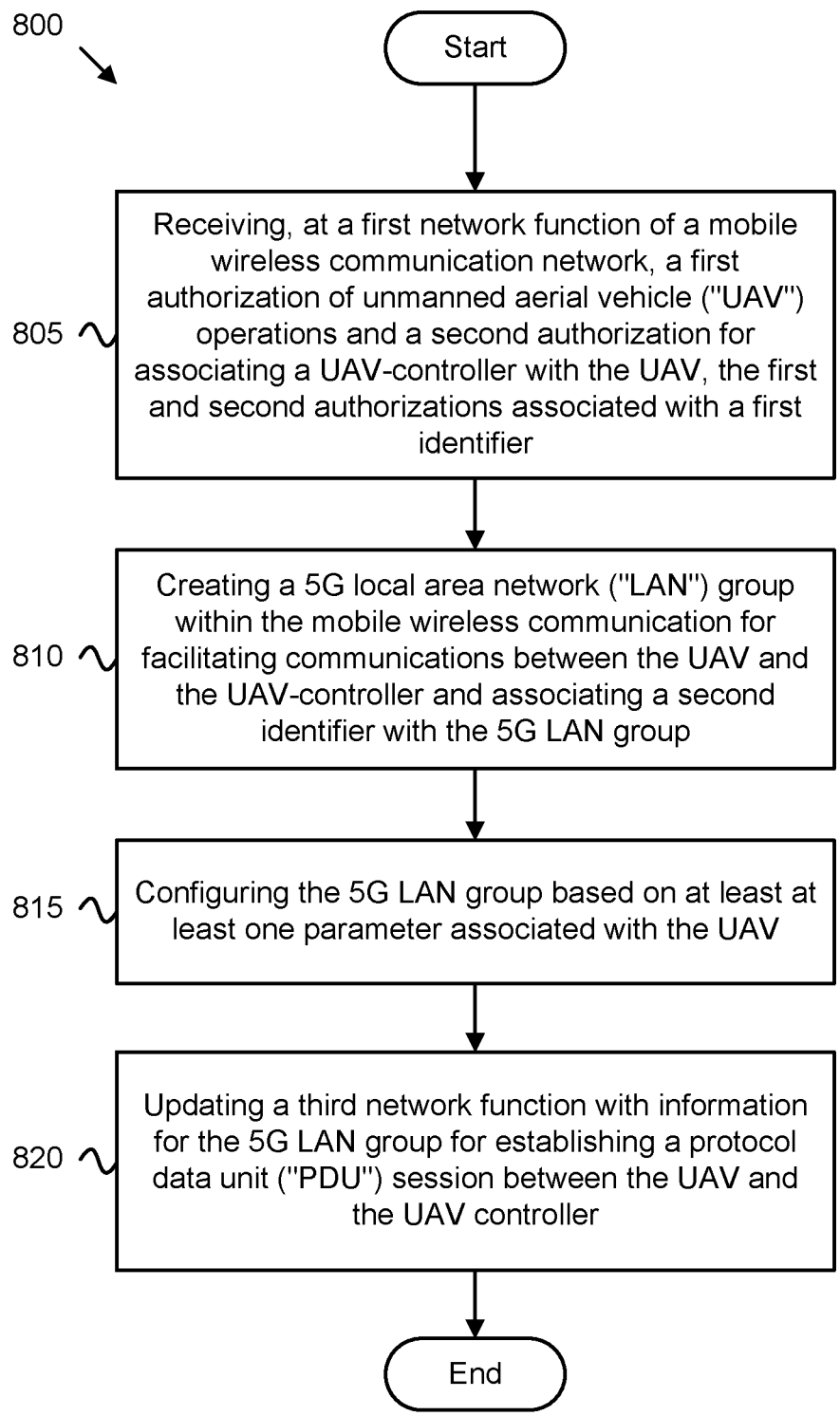
FIG. 8 is a flowchart diagram illustrating one embodiment of a method for authorizing and configuring pairing of unmanned aerial system.

FIG. 8 is a flowchart diagram of a method 800 for authorizing and configuring pairing of unmanned aerial system. The method 800 may be performed by an FCFS of a network equipment apparatus 700, described herein. In some embodiments, the method 800 may be performed by a processor executing program code, for example, a microcontroller, a microprocessor, a CPU, a GPU, an auxiliary processing unit, a FPGA, or the like.

In one embodiment, the method 800 includes receiving 805, at a first network function of a mobile wireless communication network, a first authorization of unmanned aerial vehicle ("UAV") operations and a second authorization for associating a UAV-controller with the UAV, the first and second authorizations associated with a first identifier.

In further embodiments, the method 800 includes creating 810 a 5G local area network ("LAN") group within the mobile wireless communication for facilitating communications between the UAV and the UAV-controller and associating a second identifier with the 5G LAN group.

In some embodiments, the method 800 includes configuring 815 the 5G LAN group based on at least at least one parameter associated with the UAV. In certain embodiments, the method 800 includes updating 820 a third network function with information for the 5G LAN group for establishing a protocol data unit ("PDU") session between the UAV and the UAV controller. The method 800 ends.

Figure 9:
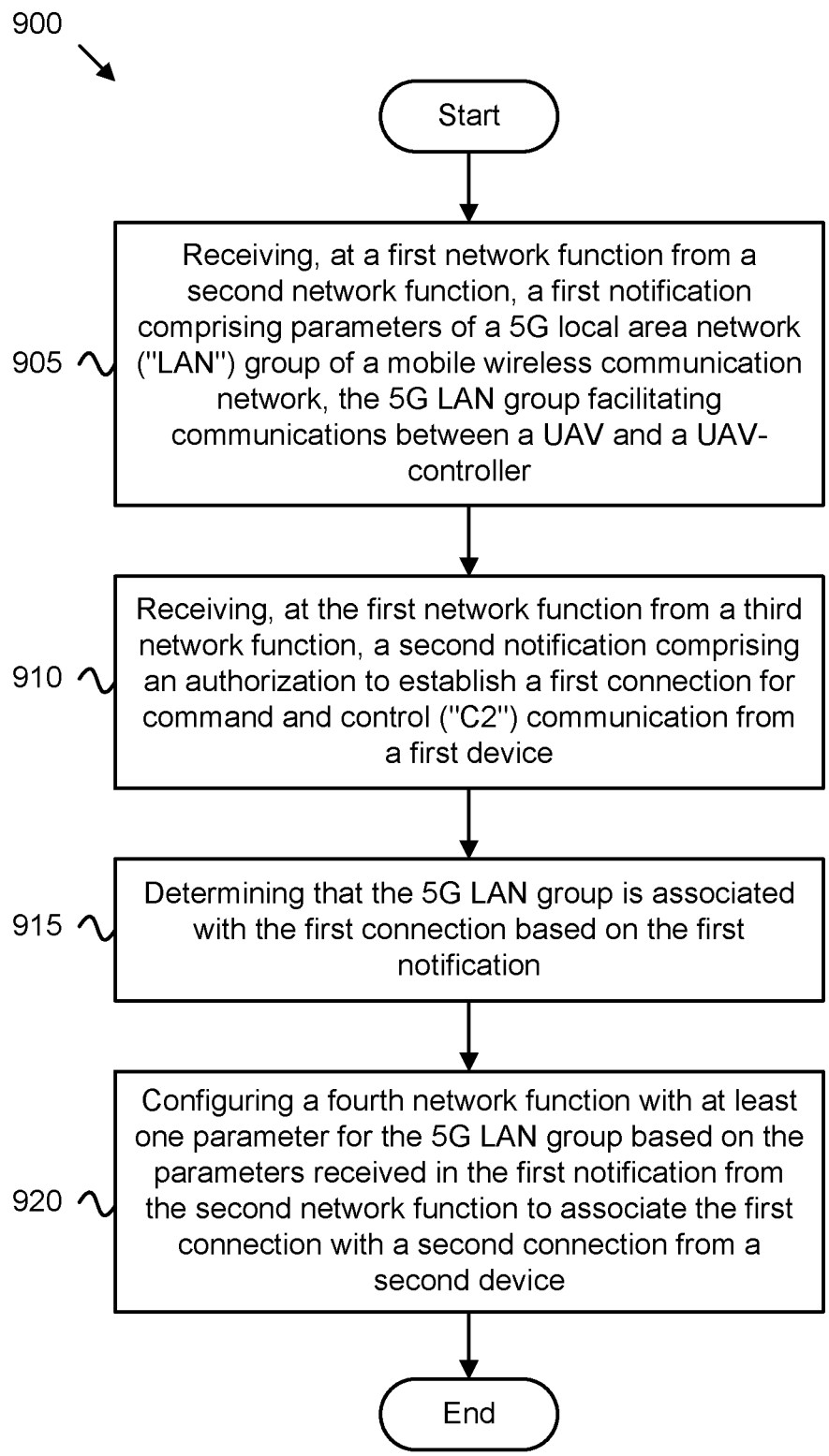
FIG. 9 is a flowchart diagram illustrating one embodiment of a method for authorizing and configuring pairing of unmanned aerial system.

FIG. 9 is a flowchart diagram of a method 900 for authorizing and configuring pairing of unmanned aerial system. The method 900 may be performed by an SMF of a network equipment apparatus 700, described herein. In some embodiments, the method 900 may be performed by a processor executing program code, for example, a microcontroller, a microprocessor, a CPU, a GPU, an auxiliary processing unit, a FPGA, or the like.

In one embodiment, the method 900 includes receiving 905, at a first network function from a second network function, a first notification comprising parameters of a 5G local area network ("LAN") group of a mobile wireless communication network, the 5G LAN group facilitating communications between a UAV and a UAV-controller.

In one embodiment, the method 900 includes receiving 910, at the first network function from a third network function, a second notification comprising an authorization to establish a first connection for command and control ("C2") communication from a first device. In further embodiments, the method 900 includes determining 915 that the 5G LAN group is associated with the first connection based on the first notification.

In some embodiments, the method 900 includes configuring 920 a fourth network function with at least one parameter for the 5G LAN group based on the parameters received in the first notification from the second network function to associate the first connection with a second connection from a second device. The method 900 ends.

Figure 10:
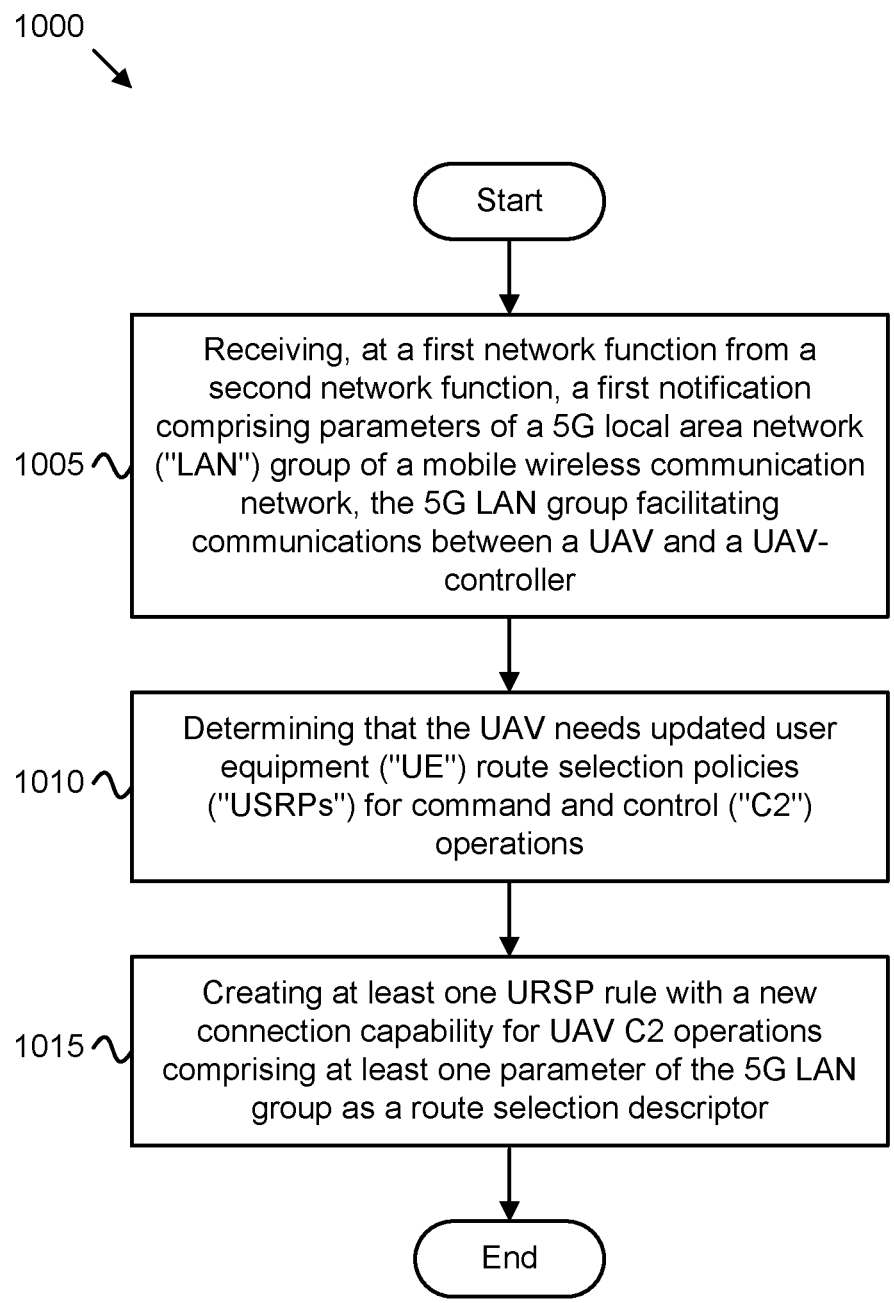
FIG. 10 is a flowchart diagram illustrating one embodiment of a method for authorizing and configuring pairing of unmanned aerial system.

FIG. 10 is a flowchart diagram of a method 1000 for authorizing and configuring pairing of unmanned aerial system. The method 1000 may be performed by a PCF of a network equipment apparatus 700, described herein. In some embodiments, the method 1000 may be performed by a processor executing program code, for example, a microcontroller, a microprocessor, a CPU, a GPU, an auxiliary processing unit, a FPGA, or the like.

In one embodiment, the method 1000 includes receiving 1005, at a first network function from a second network function, a first notification comprising parameters of a 5G local area network ("LAN") group of a mobile wireless communication network, the 5G LAN group facilitating communications between a UAV and a UAV-controller.

In certain embodiments, the method 1000 includes determining 1010 that the UAV needs updated user equipment ("UE") route selection policies ("USRPs") for command and control ("C2") operations. In one embodiment, the method 1000 includes creating 1015 at least one URSP rule with a new connection capability for UAV C2 operations comprising at least one parameter of the 5G LAN group as a route selection descriptor. The method 1000 ends.

A first apparatus for authorizing and configuring pairing of unmanned aerial system may include an FCFS of a network equipment apparatus 700, described herein. In some embodiments, the apparatus may include a processor executing program code, for example, a microcontroller, a microprocessor, a CPU, a GPU, an auxiliary processing unit, a FPGA, or the like.

In one embodiment, the first apparatus includes a transceiver that receives, at a first network function of a mobile wireless communication network, a first authorization of unmanned aerial vehicle ("UAV") operations and a second authorization for associating a UAV-controller with the UAV, the first and second authorizations associated with a first identifier.

In further embodiments, the first apparatus includes a processor that creates a 5G local area network ("LAN") group within the mobile wireless communication for facilitating communications between the UAV and the UAV-controller and associating a second identifier with the 5G LAN group, configures the 5G LAN group based on at least at least one parameter associated with the UAV, and updates a third network function with information for the 5G LAN group for establishing a protocol data unit ("PDU") session between the UAV and the UAV controller.

In one embodiment, the UAV and the UAV controller are each associated with the first identifier, the first identifier for the UAV and the UAV controller used to facilitate communications between the UAV and the UAV-controller within the 5G LAN group.

In one embodiment, the at least one parameter comprises at least one of a data network name ("DNN"), a single network slice selection assistance information ("S-NSSAI"), and an application identifier associated with the UAV. In certain embodiments, the information of the 5G LAN group includes the second identifier of the 5G LAN group, the first identifier of the UAV and the UAV controller, and at least one of a data network name ("DNN"), a single network slice selection assistance information ("S-NSSAI"), and an application identifier associated with the UAV.

In one embodiment, the third network function comprises a unified data management ("UDM") function that is updated with the 5G LAN group information using a Nudm_ParameterProvision_Create service operation.

A first method for authorizing and configuring pairing of unmanned aerial system may be performed by an FCFS of a network equipment apparatus 700, described herein. In some embodiments, the first method may be performed by a processor executing program code, for example, a microcontroller, a microprocessor, a CPU, a GPU, an auxiliary processing unit, a FPGA, or the like.

In one embodiment, the first method includes receiving, at a first network function of a mobile wireless communication network, a first authorization of unmanned aerial vehicle ("UAV") operations and a second authorization for associating a UAV-controller with the UAV, the first and second authorizations associated with a first identifier.

In one embodiment, the first method includes creating a 5G local area network ("LAN") group within the mobile wireless communication for facilitating communications between the UAV and the UAV-controller and associating a second identifier with the 5G LAN group.

In one embodiment, the first method includes configuring the 5G LAN group based on at least at least one parameter associated with the UAV. In one embodiment, the first method includes updating a third network function with information for the 5G LAN group for establishing a protocol data unit ("PDU") session between the UAV and the UAV controller.

In certain embodiments, the UAV and the UAV controller are each associated with the first identifier, the first identifier for the UAV and the UAV controller used to facilitate communications between the UAV and the UAV-controller within the 5G LAN group.

In one embodiment, the at least one parameter comprises at least one of a data network name ("DNN"), a single network slice selection assistance information ("S-NSSAI"), and an application identifier associated with the UAV.

In one embodiment, information of the 5G LAN group includes the second identifier of the 5G LAN group, the first identifier of the UAV and the UAV controller, and at least one of a data network name ("DNN"), a single network slice selection assistance information ("S-NSSAI"), and an application identifier associated with the UAV.

In one embodiment, the third network function comprises a unified data management ("UDM") function that is updated with the 5G LAN group information using a Nudm_ParameterProvision_Create service operation.

A second apparatus for authorizing and configuring pairing of unmanned aerial system may include an SMF of a network equipment apparatus 700, described herein. In some embodiments, the second apparatus may include a processor executing program code, for example, a microcontroller, a microprocessor, a CPU, a GPU, an auxiliary processing unit, a FPGA, or the like.

In one embodiment, the second apparatus includes a transceiver that receives, at a first network function from a second network function, a first notification comprising parameters of a 5G local area network ("LAN") group of a mobile wireless communication network, the 5G LAN group facilitating communications between a UAV and a UAV-controller. In further embodiment, the transceiver receives, at the first network function from a third network function, a second notification comprising an authorization to establish a first connection for command and control ("C2") communication from a first device.

In one embodiment, the second apparatus includes a processor that determines that the 5G LAN group is associated with the first connection based on the first notification and configures a fourth network function with at least one parameter for the 5G LAN group based on the parameters received in the first notification from the second network function to associate the first connection with a second connection from a second device.

In one embodiment, the parameters received in the first notification comprise at least one of a data network name ("DNN"), a single network slice selection assistance information ("S-NSSAI"), and an application identifier associated with the UAV. In some embodiments, the first connection between the UAV and UAV controller comprises a C2 connection.

In one embodiment, the processor determines that the 5G LAN group is used for the C2 connection based at least in part on the parameters received in the first notification. In some embodiments, the processor configures a group level N4 protocol data unit ("PDU") session to receive notifications for 5G LAN group updates.

A second method for authorizing and configuring pairing of unmanned aerial system may be performed by an SMF of a network equipment apparatus 700, described herein. In some embodiments, the second method may be performed by a processor executing program code, for example, a microcontroller, a microprocessor, a CPU, a GPU, an auxiliary processing unit, a FPGA, or the like.

In one embodiment, the second method includes receiving, at a first network function from a second network function, a first notification comprising parameters of a 5G local area network ("LAN") group of a mobile wireless communication network, the 5G LAN group facilitating communications between a UAV and a UAV-controller. In certain embodiments, the second method includes receiving, at the first network function from a third network function, a second notification comprising an authorization to establish a first connection for command and control ("C2") communication from a first device.

In one embodiment, the second method includes determining that the 5G LAN group is associated with the first connection based on the first notification. In various embodiments, the second method includes configuring a fourth network function with at least one parameter for the 5G LAN group based on the parameters received in the first notification from the second network function to associate the first connection with a second connection from a second device.

In one embodiment, the parameters received in the first notification comprise at least one of a data network name ("DNN"), a single network slice selection assistance information ("S-NSSAI"), and an application identifier associated with the UAV.

In one embodiment, the first connection between the UAV and UAV controller comprises a C2 connection. In one embodiment, the second method includes determining that the 5G LAN group is used for the C2 connection based at least in part on the parameters received in the first notification. In one embodiment, the second method includes configuring a group level N4 protocol data unit ("PDU") session to receive notifications for 5G LAN group updates.

A third apparatus for authorizing and configuring pairing of unmanned aerial system may include a PCF of a network equipment apparatus 700, described herein. In some embodiments, the third apparatus may include a processor executing program code, for example, a microcontroller, a microprocessor, a CPU, a GPU, an auxiliary processing unit, a FPGA, or the like.

In one embodiment, the third apparatus includes a transceiver that receives, at a first network function from a second network function, a first notification comprising parameters of a 5G local area network ("LAN") group of a mobile wireless communication network, the 5G LAN group facilitating communications between a UAV and a UAV-controller. In one embodiment, the third apparatus includes a processor that determines that the UAV needs updated user equipment ("UE") route selection policies ("USRPs") for command and control ("C2") operations and creates at least one URSP rule with a new connection capability for UAV C2 operations comprising at least one parameter of the 5G LAN group as a route selection descriptor.

In one embodiment, the parameters received in the first notification comprise at least one of a data network name ("DNN"), a single network slice selection assistance information ("S-NSSAI"), and an application identifier associated with the UAV. In one embodiment, the at least one URSP rule comprises a specific connection capability in a traffic descriptor.

In one embodiment, the at least one USRP rule comprises one of an application identifier and a traffic filter in a traffic descriptor that is mapped to an application in the UAV that is used for UAV operation. In some embodiments, the at least one USRP rule comprises a new indicator indicating UAV operation in a traffic descriptor.

A third method for authorizing and configuring pairing of unmanned aerial system may be performed by a PCF of a network equipment apparatus 700, described herein. In some embodiments, the third method may be performed by a processor executing program code, for example, a microcontroller, a microprocessor, a CPU, a GPU, an auxiliary processing unit, a FPGA, or the like.

In one embodiment, the third method includes receiving, at a first network function from a second network function, a first notification comprising parameters of a 5G local area network ("LAN") group of a mobile wireless communication network, the 5G LAN group facilitating communications between a UAV and a UAV-controller.

In further embodiments, the third method includes determining that the UAV needs updated user equipment ("UE") route selection policies ("USRPs") for command and control ("C2") operations. In some embodiments, the third method includes creating at least one URSP rule with a new connection capability for UAV C2 operations comprising at least one parameter of the 5G LAN group as a route selection descriptor.

In one embodiment, the parameters received in the first notification comprise at least one of a data network name ("DNN"), a single network slice selection assistance information ("S-NSSAI"), and an application identifier associated with the UAV. In further embodiments, the at least one URSP rule comprises a specific connection capability in a traffic descriptor.

In some embodiments, the at least one USRP rule comprises one of an application identifier and a traffic filter in a traffic descriptor that is mapped to an application in the UAV that is used for UAV operation. In certain embodiments, the at least one USRP rule comprises a new indicator indicating UAV operation in a traffic descriptor.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:
1. An apparatus, comprising:
at least one memory; and
at least one processor coupled with the at least one memory, the processor and configured to cause the apparatus to:

receive, at a first network function of a mobile wireless communication network, a first authorization of unmanned aerial vehicle ("UAV") operations and a second authorization for associating a UAV-controller with the UAV, the first and second authorizations associated with a first identifier create a local area network ("LAN") group within the mobile wireless communication for facilitating communications between the UAV and the UAV-controller and associating a second identifier with the LAN group;

configure the LAN group based on at least at least one parameter associated with the UAV; and update a third network function with information for the LAN group for establishing a protocol data unit ("PDU") session between the UAV and the UAV-controller.

2. The apparatus of claim 1, wherein the UAV and the UAV-controller are each associated with the first identifier, the first identifier for the UAV and the UAV-controller used to facilitate communications between the UAV and the UAV-controller within the LAN group.

3. The apparatus of claim 1, wherein the at least one parameter comprises at least one of a data network name ("DNN"), a single network slice selection assistance information ("S-NSSAI"), and an application identifier associated with the UAV.

4. The apparatus of claim 1, wherein information of the LAN group includes the second identifier of the LAN group, the first identifier of the UAV and the UAV-controller, and at least one of a data network name ("DNN"), a single network slice selection assistance information ("S-NSSAI"), and an application identifier associated with the UAV.

5. The apparatus of claim 1, wherein the third network function comprises a unified data management ("UDM") function that is updated with the LAN group information using a Nudm_ParameterProvision_Create service operation.

6. An apparatus, comprising:
at least one memory; and
at least one processor coupled with the at least one memory, the processor and configured to cause the apparatus to:
receive, at a first network function from a second network function, a first notification comprising parameters of a local area network ("LAN") group of a mobile wireless communication network, the LAN group facilitating communications between a UAV and a UAV-controller;
receive, at the first network function from a third network function, a second notification comprising an authorization to establish a first connection for command and control ("C2") communication from a first device;
determine that the LAN group is associated with the first connection based on the first notification; and
configure a fourth network function with at least one parameter for the LAN group based on the parameters received in the first notification from the second network function to associate the first connection with a second connection from a second device.

7. The apparatus of claim 6, wherein the parameters received in the first notification comprise at least one of a data network name ("DNN"), a single network slice selection assistance information ("S-NSSAI"), and an application identifier associated with the UAV.

8. The apparatus of claim 6, wherein the first connection between the UAV and UAV-controller comprises a C2 connection.

9. The apparatus of claim 8, wherein the at least one processor is configured to cause the apparatus to determine that the LAN group is used for the C2 connection based at least in part on the parameters received in the first notification.

10. The apparatus of claim 6, wherein the at least one processor is configured to cause the apparatus to configure a group level N4 protocol data unit ("PDU") session to receive notifications for LAN group updates.

11. An apparatus, comprising:
at least one memory; and
at least one processor coupled with the at least one memory, the processor and configured to cause the apparatus to:
receive, at a first network function from a second network function, a first notification comprising parameters of a local area network ("LAN") group of a mobile wireless communication network, the LAN group facilitating communications between a UAV and a UAV-controller; and
determine that the UAV needs updated user equipment ("UE") route selection policies ("URSPs") for command and control ("C2") operations; and
create at least one URSP rule with a new connection capability for UAV C2 operations comprising at least one parameter of the LAN group as a route selection descriptor.

12. The apparatus of claim 11, wherein the parameters received in the first notification comprise at least one of a data network name ("DNN"), a single network slice selection assistance information ("S-NSSAI"), and an application identifier associated with the UAV.

13. The apparatus of claim 11, wherein the at least one URSP rule comprises a specific connection capability in a traffic descriptor.

14. The apparatus of claim 11, wherein the at least one URSP rule comprises one of an application identifier and a traffic filter in a traffic descriptor that is mapped to an application in the UAV that is used for UAV operation.

15. The apparatus of claim 11, wherein the at least one URSP rule comprises a new indicator indicating UAV operation in a traffic descriptor.

16. The apparatus of claim 1, wherein the at least one parameter is determined according to at least one characteristic of an unmanned aerial system ("UAS") comprising the UAV and the UAV-controller.

17. The apparatus of claim 3, wherein the information of the LAN group is determined based on an unmanned aerial system ("UAS") model and type.

18. The apparatus of claim 1, wherein the first identifier comprises a subscription permanent identifier ("SUPI") for the LAN group.

19. The apparatus of claim 10, wherein the at least one processor is configured to cause the apparatus to configure the group level N4 PDU session in response to determining that there are existing active PDU sessions.

20. The apparatus of claim 13, wherein the specific connection capability indicates UAV operation.

* * * * *